XR 4,050,064
TX 350/332

United States Patent [19]

Hashimoto et al.

[11] 4,050,064
[45] Sept. 20, 1977

[54] FOUR-LEVEL VOLTAGE SUPPLY FOR LIQUID CRYSTAL DISPLAY

[75] Inventors: Shitaro Hashimoto, Shiki; Yuuichi Sato, Nara, both of Japan

[73] Assignee: Sharp Kabushiki Kaisha, Osaka, Japan

[21] Appl. No.: 685,261

[22] Filed: May 11, 1976

[30] Foreign Application Priority Data

May 14, 1975 Japan ................................ 50-57649

[51] Int. Cl.[2] ................................ G06F 3/14
[52] U.S. Cl. ................................ 340/324 M; 340/336; 350/160 LC
[58] Field of Search ....... 340/324 R, 324 M, 166 EL, 340/336; 350/160 R, 160 LC; 307/241, 251, 313, 227

[56] References Cited

U.S. PATENT DOCUMENTS

| | | | |
|---|---|---|---|
| 3,911,421 | 10/1975 | Alt et al. | 340/324 M |
| 3,936,676 | 2/1976 | Fujita | 340/324 M |
| 3,995,942 | 12/1976 | Kawakami et al. | 340/336 |

*Primary Examiner*—Marshall M. Curtis
*Attorney, Agent, or Firm*—Birch, Stewart, Kolasch & Birch

[57] ABSTRACT

A liquid crystal display enabling circuitry wherein the backplate electrode of a liquid crystal display is activated by a four-level voltage while the respective segment electrodes thereof are activated by a two-level voltage. This includes at least two input terminals, five output terminals, a voltage dividing resistor network and complementary MOSFET switching means and thereby provides the four-level voltage for the backplate electrode and the four-level voltage for the segment electrodes. In addition, this may be implemented with MOS integrated circuitry technology (and not bipolar integrated circuitry technology).

11 Claims, 7 Drawing Figures

(SEGMENT ENABLE SIGNAL FORMATION)

(BACKPLATE ENABLE SIGNAL FORMATION)

(FOUR-LEVEL VOLTAGE SUPPLY)

FOUR-LEVEL VOLTAGE SUPPLY FOR LIQUID CRYSTAL DISPLAY

BACKGROUND OF THE INVENTION

The present invention relates to a voltage supply, and more particularly to a voltage supply circuitry for providing a liquid crystal display with desired voltage levels.

Many electronic apparatus employing liquid crystal displays as their output means have recently been developed. However, the inherent characteristics of the liquid crystal displays were not fully utilized in the electronic apparatus. In the case where implementations of these apparatus were through integrated circuitry technology, a variety of problems were experienced due to the fact that breakdown voltage of the integrated circuitry was higher than the display enabling voltage. For example, increase in the number of terminals of the integrated circuitry and addition of amplifiers associated with the display enabling circuitry were necessary to overcome these problems.

Accordingly, it is an object of the present invention to provide an improvement in a liquid crystal display enabling circuitry which attains reduction of the number of integrated circuitry terminals and simplification in voltage supply circuitry.

The above and other objects and novel features of the present invention are set forth in the appended claims and the present invention as to its organization and its mode of operation will best be understood from a consideration of the following detailed description of the preferred embodiments when used in connection with the accompanying drawings.

DETAILED DESCRIPTION OF THE INVENTION

Figure 1:
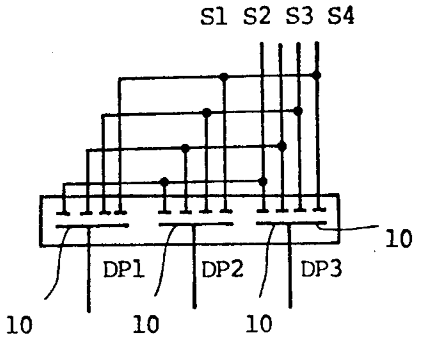
FIG. 1 is a schematic diagram of a multi-digit liquid crystal display.
Figure 2:
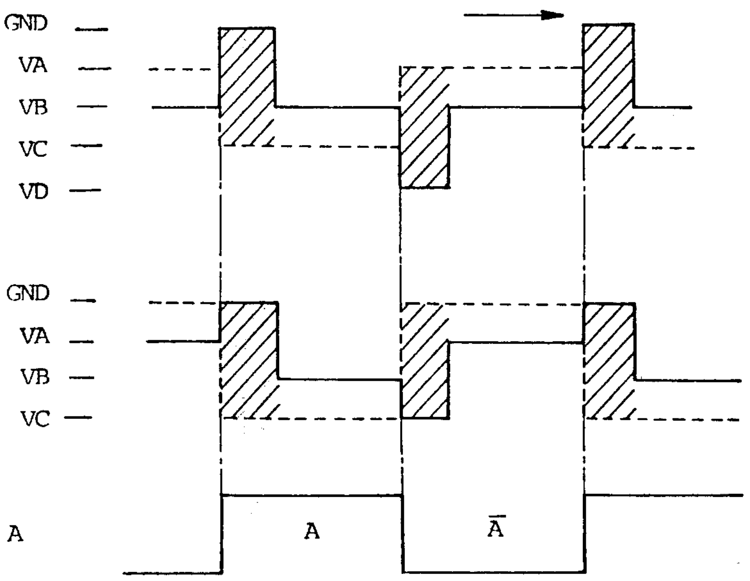
FIG. 2 is a timing chart for illustrating the principal concept of a multi-digit liquid crystal display enabling circuitry embodying the present invention.

Generally, as viewed from FIG. 1, a multi-digit liquid crystal display comprises a predetermined number of liquid crystal units DP1-DP3 each having a common or backplate electrode 10 and a plurality of segment electrodes 20 (only three digits in the given example). In the upper portion of FIG. 2 illustrating the conventional driving manner, five different voltage levels VA-VD and GND are established one of which is equal to ground potential denoted GND (it will be called "reference potential" hereinafter). A three-level voltage which alternates between the voltage levels GND and VD with respect to the voltage level VB as shown by the solid line in FIG. 2 is supplied to the common electrodes 10 whereas a two-level voltage alternating between the voltage levels VA and VC is supplied to the segment electrodes 20. If as depicted in FIG. 2 by hatched oblique lines a voltage across the electrodes 10 and 20 is sufficient high to initiate a change in the optical characteristics of the liquid crystal, then the liquid crystal display will provide a visual indication. This mode of operation is repeated in a dynamic fashion. In the upper portion of FIG. 2, a voltage across both electrodes during a period of time not hatched with oblique lines is one which will not cause the change in the optical characteristics of the liquid crystal.

For example, while functional components of an electronic calculator such as a central processing unit and memories may be implemented with complementary MOS LSI technology, the liquid crystal display enabling system discussed briefly may not be incorporated into the same LSI chip due to the following reason. The threshold level of voltage which initiates the change in the liquid crystal characteristics is about 18V and the potential difference between VD and GND as shown by the upper portion of FIG. 2 should be therefore 24V. Since this does usually exceed breakdown voltage of CMOS LSI devices, the liquid crystal display enabling circuitry cannot be incorporated onto the same LSI chip. It will be clear from the upper portion of FIG. 2 that alternating biasing voltage is applied across the liquid crystal display also when it is not desired to be ON, as suggested and shown in U.S. Pat. No. 3,902,169, DRIVE SYSTEM FOR LIQUID CRYSTAL DISPLAY UNITS, issued Aug. 26, 1975 by Isamu Washizuka and assigned to the same assignee as the present application.

Accordingly, such a circuitry includes a one-chip bipolar IC for amplifying the enabling voltage with the resulting complexity of the implementations and increase of power dissipation. Moreover, five different constant-voltage sources of VA-VD and GND are required with accompanying complex power supply circuitry.

The lower portion of FIG. 2 illustrates the principal concept of the liquid crystal display enablement in accordance with the present invention, wherein three different voltage levels VA, VB and VC are established in addition to the reference level GND and the potential difference between VC and GND is selected equal to the threshold level of voltage of the liquid crystal display (that is, 18V). The symbol A shown herein designates control signals for achieving display enabling in an alternate mode. The four-level voltage supply for liquid crystal displays is more fully shown and described in co-pending application, CMOS DRIVE SYSTEM FOR LIQUID CRYSTAL UNITS, Ser. No. 565,269, filed Apr. 4, 1975 by Shintaro Hashimoto and Hirohide Nakagawa and assigned to the same assignee as the present invention, the disclosure of which is incorporated herein by reference. In addition, a three-level alternating voltage application is disclosed in detail in co-pending application, LIQUID CRYSTAL DISPLAY SYSTEM, Ser. No. 514,928, filed Oct. 14, 1974 by Isamu Washizuka and Hirohide Nakagawa now U.S. Pat. 3,976,994 the disclosure of which is incorporated herein by reference.

Figure 3:
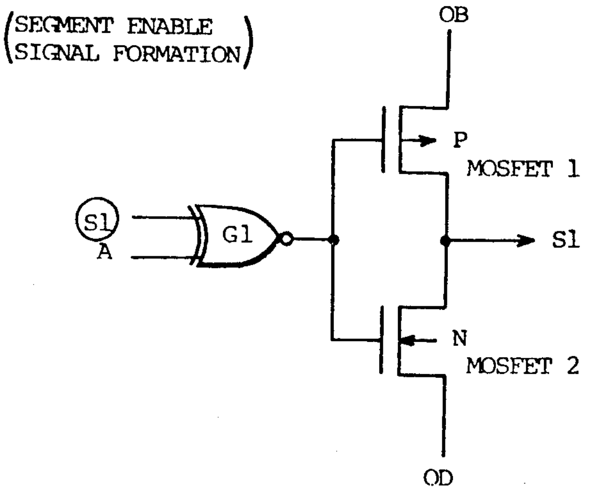
FIG. 3 is a circuit diagram of a segment enable signal formation portion of the multi-digit liquid crystal display enabling circuitry of the present invention.

Referring now to FIG. 3, there is illustrated a formation circuitry for deriving segment enable signals S1 from segment selection signals (S1). As obvious to those skilled in the art, the segment selection signals (S1) are ones which are outputted via a decoder from an information storage register. The segment selection signals (S1) of OV indicate the corresponding segments to be selected, while the same of −18V (=VC) to be non-selected.

A gate G1 determines whether there is an equivalency between the signals (S1) and the control signals A (shown in FIG. 2) and then provides its output S1′ for the respective gate electrodes of a complementary MOS circuitry which is a series connection of a P-channel MOSFET 1 and an N-channel MOSFET 2. The MOSFET's 1 and 2 have their source electrodes respectively connected to output terminals OB and OD of a voltage supply circuitry discussed later and their drain electrodes commonly connected. The segment enable signals S1 are derived from the commonly connected drain electrodes of the CMOS circuitry. Therefore, the signals S1 assumes which of voltage levels from the output terminals OB and OD in accordance with the instantaneous potential of the output S1′.

Figure 4:
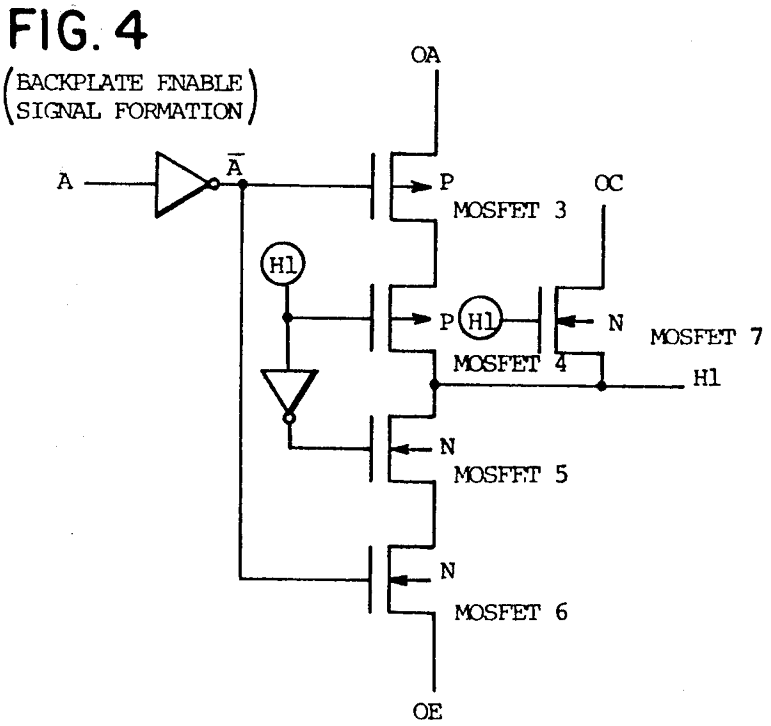
FIG. 4 is a circuit diagram of a backplate enable signal formation portion of the multi-digit liquid crystal display enabling circuitry.

FIG. 4 is a circuit diagram of a circuitry for forming backplate enable signals H1 in dependence upon digit selection signals (H1) which are usually derived from a timing counter.

This circuitry includes a series connection of P-channel MOSFET's 3 and 4, a series connection of N-channel MOSFET's 5 and 6 and an N-channel MOSFET 7 of which the drain electrode is connected to the junction of the drain electrodes of the MOSFET's 4 and 5. The respective source electrodes of the MOSFET's 3, 6 and 7 are connected to output terminals OA, OE and OC of the voltage supply circuitry.

The gate electrodes of the MOSFET's 3 and 6 receive the reverse A of the control signals A, while the counterparts of the MOSFET's 4, 5 and 6 receive the signals (H1), (H1) and (H1). As a result, the backplate enable signals H1 are derived from the commonly connected drain electrodes. The backplate enable signals assume the potential levels of the output terminals OA, OE and OC in accordance with combinations of $\bar{A}$ (H1) and (H1).

Figure 5:
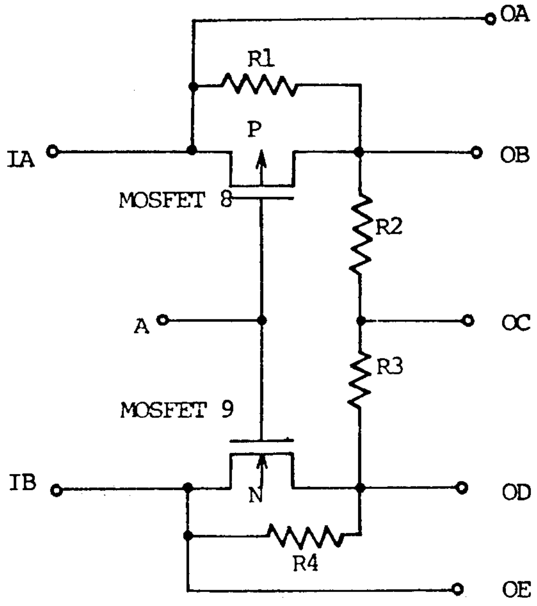
FIG. 5 is a circuit diagram of a four-level voltage supply portion of the multi-digit liquid crystal enabling circuitry.

A four-level voltage supply circuitry shown in FIG. 5, a significant part of the present invention, comprises a first input terminal 1A coupled with the reference level OV, a second input terminal IB coupled with a constant-voltage source VC and output terminals for supplying desired voltage levels to the liquid crystal display. The input terminal IA is connected directly to the output terminal OA and the input terminal IB is connected directly to the output terminal OE. A series connection of resistors R1, R2, R3 and R4 is inserted between the input terminals IA and IB. The respective junctions in the resistor series connection are tied to the output terminals OB, OC and OD. The resistors R1–R4 are of the same resistance value. A P-channel MOSFET 8 is connected in parallel with the resistor R1 and an N-channel MOSFET 9 is connected in parallel with the resistor R4. The MOSFET's 8 and 9 are switchable between ON and OFF states as a function of the control signals A applied to their gate electrodes.

Figure 6:
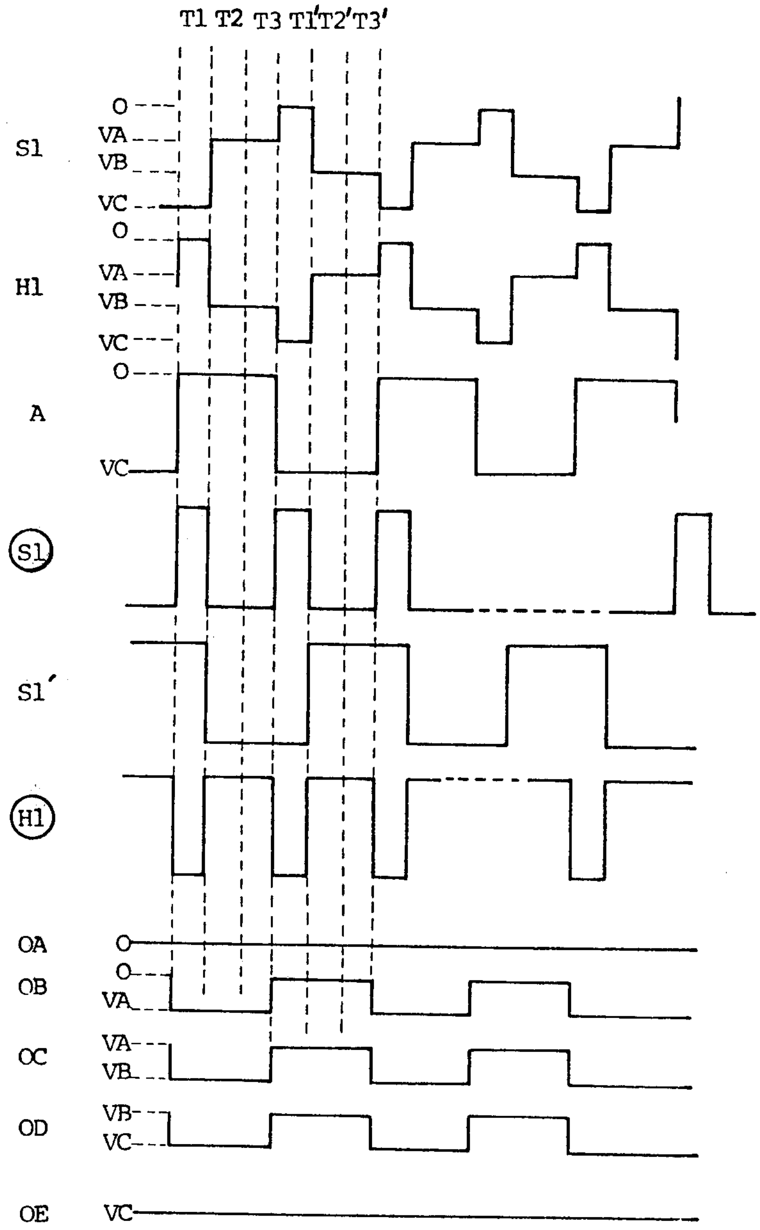
FIG. 6 is a timing chart illustrating various signals which occur at the circuitry portions of FIGS. 3 through 5.

The mode of operation of the present four-level voltage supply circuitry of FIG. 5 will be now described with reference to FIG. 6 illustrating waveforms of various signals which occur within the circuit portions of FIGS. 3 through 5.

In FIG. 6, there are illustrated waveforms of the backplate enable signals H1 to be supplied to the common electrode 10 and the segment enable signals S1 to be supplied to the segment electrodes S1. In the given example, a specific segment 20 of the liquid crystal display DP1 is activated only during a period of time T1 and not during periods of time T2 and T3. In other words, the liquid crystal display is activated upon receipt of voltage supply of 18V between the electrodes 10 and 20. By way of example, VA = −6V, VB = −12V and VC = −18V.

Since during the periods of time T1 - T3 the control signal A is at OV, the MOSFET 9 is ON to render a path between the input terminal IB and the output terminal OD shunted. As a consequence, the voltage level VC is divided through the resistors R1, R2 and R3 so that the voltage levels VA, VB and VC develop at the output terminals OB through OD. It is concluded that OA = OV, OB = VA, OC = VB and OD = OE = VC.

Conversely, since A = VC during periods of time T1′ through T3′, the MOSFET 8 is ON with the resulting shunt of a path between the input terminal IA and the output terminal IB. The voltage level VC is divided through the resistors R2, R3 and R4 and thus divided voltage levels VA and VB are developed at the output terminals OC and OD. It follows that OA = OB = OV, OC = VA, OD = VB and OE = VC. In this way, the output terminals OB, OC and OD provide their outputs having voltage variation of ⅓ VC in response to the control signals A.

When the output S1′ is introduced into the gate electrodes of the MOSFET's 1 and 2, the MOSFET 1 is ON because of S1′ = OV during the period T1. The potential at OD is outputted as the potential of the signal S1. OD = VC since the potential at OD is VC during the period T1. Thereafter, the MOSFET 1 becomes ON because of S1′ = VC during the succeeding periods of time T2 - T3 so that the potential at OB is outputted as that of the signal S1. The same circumstance may be viewed during the period T1′. Therefore, the segment enable signals of the waveform of which is illustrated in FIG. 6 are resulted.

Meanwhile, the signals (H1) applied to the gate electrodes of the MOSFET's 4, 5 and 6 turn ON the MOSFET 4 due to (H1) = VC at the time T1. The MOSFET 3 at its ON state due to $\bar{A}$ = VC gates and transfers the potential at the output terminal OA as that of the backplate enable signals H1. (H1) = OV, (H1) = VC and $\bar{A}$ = VC at the time T2 - T3 such that the potential at OC is outputted as that of the signal H1 via the MOSFET 7. At the time T1′ (H1) = VC, (H1) = OV and $\bar{A}$ = OV such that the potential at OE is outputted as the signal H1 through the MOSFET's 6 and 5. The waveform of the thus resulted backplate enable signals H1 is illustrated in FIG. 6.

In this manner, in accordance with the voltage supply circuitry of the present invention the output potentials of the output terminals are altered in response to the control signals A with the resultant simplification in the liquid crystal display enabling circuitry. As noted earlier, in the case where the liquid crystal display enabling circuitry is incorporated onto a one-chip CMOS LSI chip together with processing units and memories, the present invention is contributive to simplification in LSI implementations, reduction in the number of terminals for introducing voltage levels and reduction in power dissipation.

For liquid crystal materials of the dynamic scattering mode, the threshold level of voltage of 18V is required. The four-level voltage supply of the present invention permits the input voltage to be reduced to 18V. In case of the field effect mode liquid crystal, the liquid crystal display may be driven directly by the CMOS LSI device. It is also possible to drive directly the liquid crystals of the dynamic scattering mode with aids of the development of high-voltage CMOS LSI devices and low-voltage DSM liquid crystal materials.

Usually, four different terminals are required as the voltage introducing terminals for the voltage levels VA, VB, VC and GND (OV) together with four different constant-voltage sources. Nevertheless, in accordance with the present invention only two terminals are required for entry of the voltage levels VC and GND. In addition, in the event that the voltage level GND is OV only one constant-voltage source of VC is needed.

Figure 7:
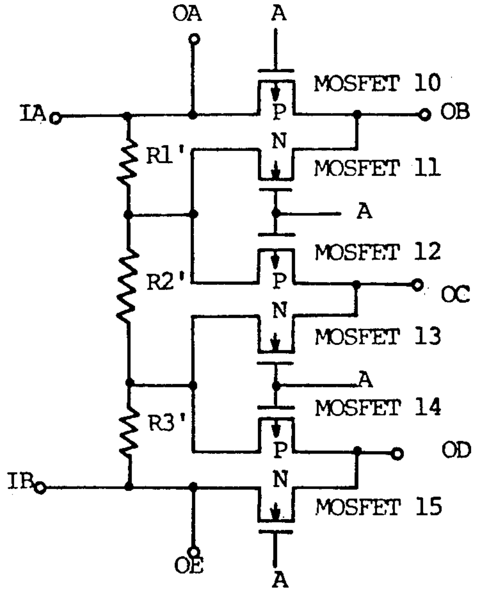
FIG. 7 is a circuit diagram of a modification of the four-level voltage supply portion of FIG. 5.

The voltage supply circuitry of the present invention is of greater advantage for a variety of the reasons set forth above. PNP type transistors and NPN type transistors may be employed instead of the P-channel MOSFET's and the N-channel MOSFET's illustrated in the embodiment of FIG. 5, respectively. In this instance one-chip LSI implementations are available. Also instead of the resistors R1 - R4 forward voltage drops of diodes may be utilized. In addition, as viewed from FIG. 7, three resistors R1' - R3' are included and the divided voltages are selected by MOSFET's 10 through 15.

As discussed above, the present invention provides a very unique and innovative approach specifically in incorporating a control unit, one or more memories, a liquid crystal display enabling circuit and a voltage supply circuitry of an electronic calculator onto a one-chip LSI device. As clear from the foregoing, the voltage supply circuit of the present invention for use in liquid crystal enabling circuitry is characterized in that the output voltage levels at the output terminals thereof are altered or changed in a periodic manner. Moreover, the present invention is effective to minimize the number of MOSEFET's which usually require small ON resistance and in other words large area.

While only certain embodiments of the present invention have been described, it will be apparent to those skilled in the art that various changes and modifications may be made therein without departing from the spirit and scope of the invention as claimed.

What is claimed is:

1. Voltage supply circuitry for supplying to a liquid crystal display first, second and third voltage levels in addition to a reference level, comprising:

first and second input terminals, the first input terminal being connected to the first voltage level and the second input terminal being connected to the reference level;

first, second, third, fourth and fifth output terminals for providing desired voltage levels to the liquid crystal display;

impedance means interposed between the first input terminal and the second input terminal for producing the second and third voltage levels;

connection means for always providing the first and reference levels to the first output terminal and the fifth output terminal respectively; and switching means for selectively providing the first, second, third and reference voltage levels to the second, third and fourth output terminals.

2. A voltage supply circuitry as defined in claim 1 wherein the first voltage level is selected equal to the threshold level of voltage which initiates a change in the optical characteristics of the liquid crystal display and the reference voltage level is selected equal to ground potential.

3. A voltage supply circuitry as defined in claim 2 wherein the impedance means includes four resistors for dividing the potential difference between the first voltage level and the reference voltage level by three.

4. A voltage supply circuitry as defined in claim 1 wherein the switching means includes complementary transistors.

5. A voltage supply circuitry as defined in claim 4 wherein the complementary transistors are implemented with CMOS technology.

6. A voltage supply circuitry is defined in claim 1 wherein the liquid crystal display is of the multi-digit type.

7. A voltage supply circuitry as defined in claim 6 wherein each digit of the liquid crystal display comprises a common electrode and a plurality of segment electrodes.

8. A voltage supply circuitry as defined in claim 6 wherein the common electrode is activated by a four-level voltage while the segment electrodes are activated by a four-level voltage.

9. A voltage supply circuitry as defined in claim 8 wherein the four-level voltage alternates between the first voltage level and the reference level when the liquid crystal display is to be activated, and alternates between the second and third voltage levels when the same is not to be activated.

10. A voltage supply circuitry as defined in claim 8 wherein the segment activating means includes complementary MOSFET's responsive to information signals derived from an information storage.

11. A voltage supply circuitry as defined in claim 8 wherein the common electrode activating means includes a series connection of complementary MOSFET's responsive to timing signals derived from a counter.

* * * * *